United States Patent
Nair et al.

(10) Patent No.: US 6,794,602 B2
(45) Date of Patent: Sep. 21, 2004

(54) METHOD AND APPARATUS FOR CLEANING GENERATOR AND TURBINE COMPONENTS

(75) Inventors: N. Kutty Nair, Scotia, NY (US); Andrew Travaly, Ballston Spa, NY (US); Chris Kilburn, Schenectady, NY (US); Todd J. Fischer, Ballston Spa, NY (US); John F. Nolan, Latham, NY (US)

(73) Assignee: General Electric Company, Schenectady, NY (US)

( * ) Notice: Subject to any disclaimer, the term of this patent is extended or adjusted under 35 U.S.C. 154(b) by 96 days.

(21) Appl. No.: 09/981,632

(22) Filed: Oct. 18, 2001

(65) Prior Publication Data

US 2003/0085203 A1 May 8, 2003

(51) Int. Cl.⁷ .............................................. B23K 26/00
(52) U.S. Cl. .................................................. 219/121.6
(58) Field of Search ...................... 219/121.69, 121.65, 219/121.66, 121.67, 121.68, 121.83; 134/1, 1.3, 2, 21; 700/159, 166

(56) References Cited

U.S. PATENT DOCUMENTS 4,588,885 A * 5/1986 Lovoi et al. ................. 134/1
5,986,234 A * 11/1999 Matthews et al. ...... 219/121.68

OTHER PUBLICATIONS

"Laser Ablation Knocks off Contamination by Atomizing Paint", F2 Associates, Inc. of Albuquerque, N.M. and reported in *Initiatives*, vol. 5, Winter, 1998, pp. 1–2.

* cited by examiner

Primary Examiner—Kiley Stoner
Assistant Examiner—Jonathan Johnson
(74) Attorney, Agent, or Firm—Nixon & Vanderhye P.C.

(57) ABSTRACT

A method and apparatus for cleaning a generator or turbine component using a laser ablation technique. The method includes programming a controller coupled to a laser source for controlling the laser source to perform laser ablation. A laser beam is directed at a generator or turbine component surface for vaporizing surface contaminants and coatings deposited on the generator or turbine component surface without changing material properties of said generator or turbine component. A computer system having a processor and a database is communicatively coupled to the controller. The database is loaded with turbine or generator component data and corresponding laser power related data for ablating surface contaminants and coatings from respective components. The apparatus also includes a detector disposed adjacent to the turbine or generator component to monitor ablation process and provide feedback data to the computer system, and a comparator for comparing the feedback data with predetermined data to determine progress of ablation. The laser source is controlled to produce a laser beam depending on the comparison step.

7 Claims, 4 Drawing Sheets

METHOD AND APPARATUS FOR CLEANING GENERATOR AND TURBINE COMPONENTS

This invention relates to generator and turbine machinery. More particularly, it relates to a laser based ablation method for cleaning generator and turbine components.

BACKGROUND OF THE INVENTION

Laser machining processes transport photon energy into target material in the form of thermal energy or photochemical energy, they remove material by melting and blow away, or by direct vaporization/ablation processes. On the other hand, traditional machining processes rely on mechanical stresses induced by tools to break molecular bonds created in the target material.

Traditional solutions for removing contaminated or unwanted surface coatings involved grinding the surface with abrasives or chemically treating the surface with solvents or acids to lift the surface coating for scraping. EPA and OSHA restrictions on solvents and acids have forced modern industry to turn increasingly to two alternatives: (1) sandblasting, or other pneumatically driven particulate, and (2) water jetting. When cleaning an exposed area with these typical materials, they also become contaminated as they come into contact with the contaminated surface. Thus, these conventional cleanup efforts add volume to the waste stream and, in hazardous situations, require additional treatment of the material used in the cleaning or cutting process.

Usually, the first step in the surface preparation process is to mechanically remove rust or debris from the substrate. Wiping loose dust and dirt of f the part is an example of mechanical cleaning. Typically, though, more aggressive mechanical action is needed to remove rust or other contaminates. Rust and metal scales can be removed mechanically by sanding, brushing with a wire brush or plastic "wool" pads, or by using abrasive blasting techniques. Abrasive blasting can also be used for removing old paint from products, and solvent-based chemical stripping is another option.

For generator or turbine components, after a generator rotor is removed from the stator, internal components need to be cleaned for maintenance, any needed repairs or a partial or full rewind of a system. Cleaning involves removing dust, oily deposits and other surface contamination. For example, if the old rotor windings are removed for a rewind, then cleaning involves removal of residual insulation and resins from the coil slots in rotor forging. Likewise, if the rotor coils are to be reused, removal of insulation and resins from the coils is also required. Exemplary components requiring cleaning include generator stator core, stator end windings, rotor forging, retaining rings, to name but a few.

The current methods of cleaning generator stator core are essentially manual, using scrapers made of textolite, wiping with rags soaked in approved cleaning solutions, and final cleaning with clean dry rags. Corncob blasting has also been used on stator end windings that have been heavily contaminated as a result of winding failure. Rotor forging and rotor coils to be reused are cleaned by blasting with glass beads. Rotor coils wrapped with glass mica tape are heated in an oven to burn off the tape and subsequently cleaned with approved solvents and rags.

Laser ablation can clean the components with no damage to the parent material and at the same time significantly reduce the amount of waste products generated. Laser ablation efficiently removes selected surface contaminants from generator components without damaging the parent materials and thus significantly reduces the waste products generated.

As described above, several different methods are being used to clean components of generator stator and rotor. Containing, removing and disposing of the used glass beads and corn cob processes related to collecting and disposing of the contaminated rags after cleaning pose an environmental hazard. Workmen are exposed to hazardous chemical cleaners and are subjected to potential exposure to airborne contamination of the media used for blast cleaning. The blast cleaning media can escape from the enclosure and contaminate the surrounding area. Thus, there is a need to overcome the problems faced by prior approaches.

These methods of cleaning are very labor intensive and generates considerable amount of waste material that has to be disposed of. Some of the cleaning solvents used are classified as hazardous. Thus, there is a need to overcome the above-identified problems faced by traditional techniques.

BRIEF SUMMARY OF THE INVENTION

Accordingly, the present invention provides a laser ablation method and apparatus to clean generator and turbine components overcoming problems faced by prior methods. The laser ablation method of the present invention uses short pulses of a laser to cause very localized deposits of energy causing surface deposits to vaporize and explode, and thereby releasing the contaminant deposits from the surface they are attached to. Contaminant vapors are then removed and filtered by a vacuum collection system. The laser ablation method of the present invention significantly reduces waste products due to the vaporization of contaminants during removal.

Specifically, the apparatus of the present invention includes a laser source, a modulator for modulating a laser beam generated by the laser source to ablate a contaminated surface of a machine component. During operation, a laser beam is directed at a surface of a machine component to be cleaned. On the surface, the contaminated material to be removed is heated rapidly to vaporize the material while ensuring that the material properties of the parent material/base material of the machine component remain unchanged. Preferably, the surface temperature of the base material of the machine component that is being cleaned is not changed, thereby preventing any mechanical or thermal damage or change in material properties of the base material.

In one aspect, the present invention relates to a method of cleaning a generator or turbine component using a laser, the method comprising programming a controller coupled to a laser source for controlling the laser source to perform laser ablation; directing a laser beam at a generator or turbine component surface for vaporizing surface contaminants and coatings deposited on said generator or turbine component surface without changing base material properties of said generator or turbine components. The method further includes coupling the controller to a computer system having a processor and a database; loading the database with turbine or generator component data and corresponding laser power related data for ablating surface contaminants and coatings from the turbine or generator components; providing a detector to monitor ablation process and provide feedback data to the computer system; comparing the feedback data with predetermined data to determine progress of ablation; and controlling the laser source depending on the comparison step, and disposing vapors generated during laser ablation.

In another aspect, a laser based system for removing contaminants deposited on a machine component surface, comprises a laser source; a controller for controlling the laser source, the controller causing the laser to emit a laser beam such that the contaminants deposited on the machine component surface are ablated without changing base material properties of the machine component. The controller is preferably programmed to control the laser source. The system further includes a computer system coupled to the controller; a detector disposed adjacent the generator or turbine component to monitor the progress of laser ablation using the laser beam from the laser source, the detector providing the monitored data to the computer system for causing the controller to vary the power of the laser beam from the laser source. The computer system preferably includes a processor having a comparator; and a database for storing turbine or generator component data, and respective laser power related data for causing laser ablation of surface contaminants and coatings of the turbine or generator components.

In another aspect, a laser-based system for cleaning a generator or turbine component, comprises a controller coupled to a laser source for controlling the laser source to perform laser ablation; means for directing a laser beam at a generator or turbine component surface for vaporizing surface contaminants and coatings deposited on the generator or turbine component surface without changing base material properties of the generator or turbine component. The system also includes a computer system having a processor and a database, the computer system communicatively coupled to the controller, and wherein the database is loaded with turbine or generator component data and corresponding laser power related data for ablating surface contaminants and coatings from the turbine or generator components; a detector disposed adjacent to the turbine or generator component to monitor ablation process and provide feedback data to the computer system; a comparator for comparing the feedback data with predetermined data to determine progress of ablation; and means for controlling the laser source depending on the comparison step.

In a further aspect, the present invention provides a laser-based method for cleaning a machine component, the method comprising controlling a laser source to modulate a laser beam for performing laser ablation; directing the laser beam towards a component surface for vaporizing surface contaminants and coatings deposited on the component surface without changing base material properties of the component; communicatively coupling a computer system having a processor and a database to the controller; loading the database with data related to the component and corresponding laser power related data for ablating contaminants and coatings from the turbine or generator components; monitoring ablation process of the component using a detector, the detector being disposed adjacent to the component; receiving feedback data from the detector at the computer system; comparing the feedback data with predetermined data in a comparator to determine progress of ablation; and controlling the laser source depending on the comparison step.

In yet another aspect, the present invention provides an apparatus for cleaning a generator or turbine components using a laser beam, the apparatus including means for controlling a laser source to perform laser ablation; and means for directing a laser beam at a generator or turbine component surface for vaporizing surface contaminants and coatings deposited on the generator or turbine component surface without changing base material properties of the generator or turbine components.

DETAILED DESCRIPTION OF THE INVENTION

Figure 1:
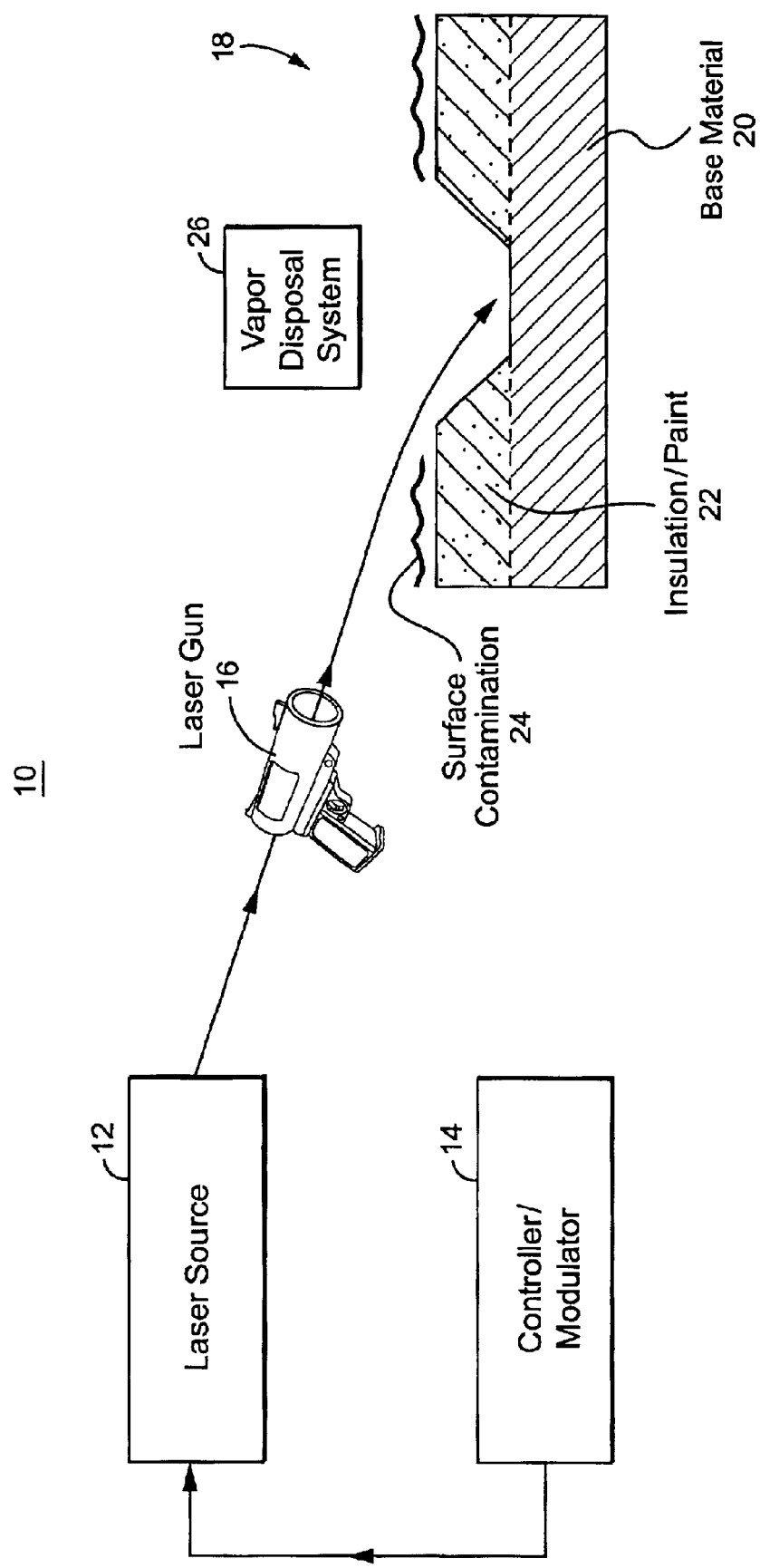
FIG. 1 is a schematic of a system for cleaning machine components using laser ablation technique in accordance with an exemplary embodiment of the present invention.

Referring to FIG. 1, there is shown a schematic of a laser ablation system 10 for cleaning machine components. System 10 includes a laser source 12 for generating a laser beam used for ablating surface contaminant material 24 from a machine component 18. The laser beam produced from the laser source 12 is preferably directed at the machine component 18 using a laser gun 16. Laser source 12 operates under the control of a controller/modulator 14. The controller 14 may be pre-programmed to control the power and duration of operation of laser source 12 such that only contaminants at a surface 24 and coating material 22, such as for example, insulation/paint, are ablated without changing the properties of the base material 20 of component 18. The laser power and the duration of operation of the laser source 12 required to achieve such precision may be determined apriori. A trial-and-error method may be adopted in order to determine the laser power and duration for ablating the surface contaminants and coating from a specific machine component, and this data may be archived in a database.

Figure 2:
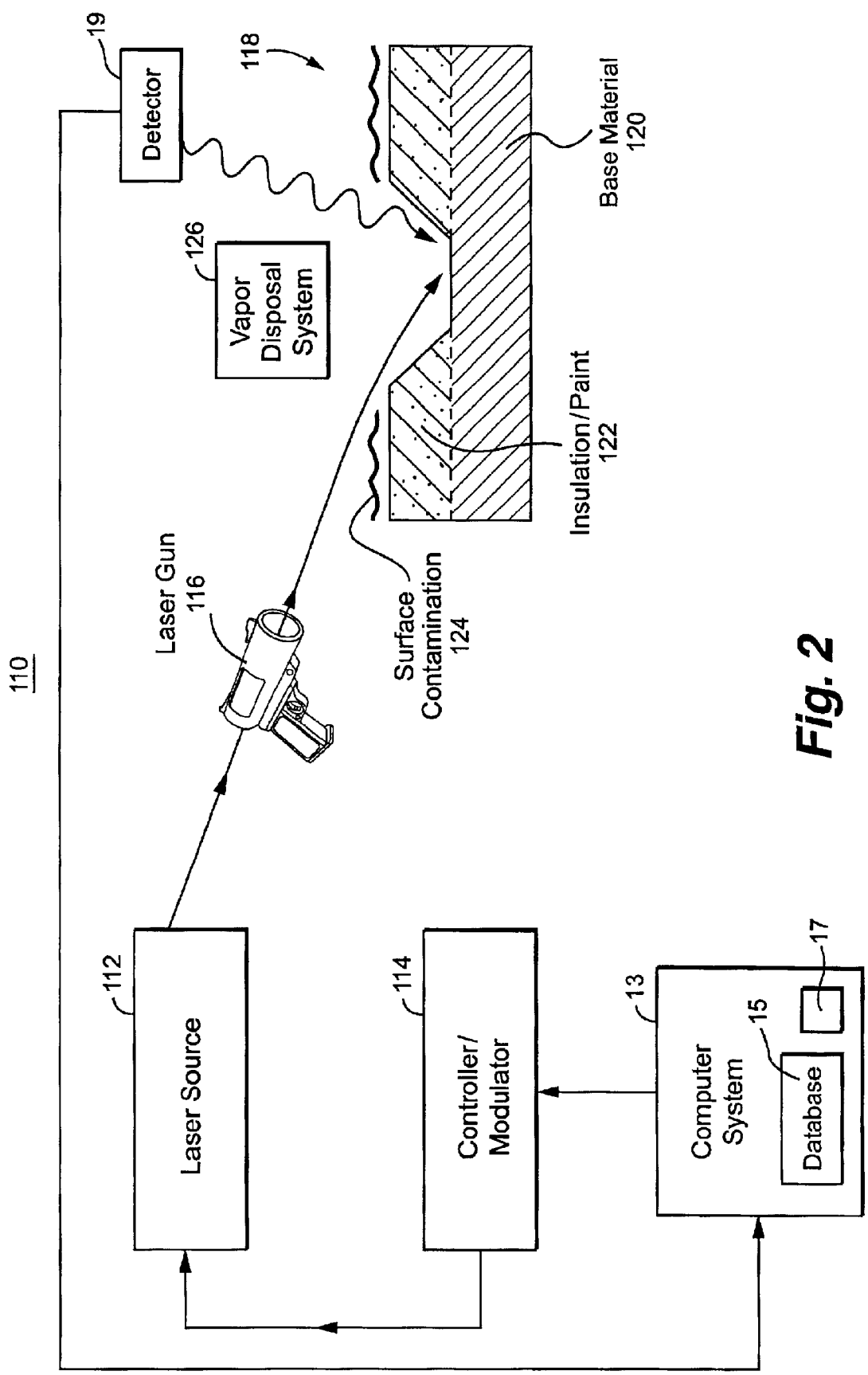
FIG. 2 illustrates another embodiment of the present invention.

FIG. 2 shows another embodiment of the present invention wherein like elements are depicted with like numerals with a prefix "1" added. Here system 110 includes a controller 114 which is coupled to a computer system 13 having a database 15, and a processor 17. The database 15 is preferably loaded with data related to various machine components of a generator or a turbine system, their respective properties, and corresponding laser power related data for ablating respective material coatings and surface contaminants. For example, the material properties may include material composition, thickness of the base material, composition of the coating material, thickness of the coating, and so forth to name but a few. Since the operating environment of a machine component is known apriori, the possible contaminants to which the machine component is exposed are known apriori. Thus, the laser power required to ablate such contaminants is determined apriori and loaded into the database 15 of the computer system 13.

System 110 further includes a detector system 19 capable of detecting the degree of ablation caused by a laser beam from the laser source 112. The detected information is fed back to the computer system 13 wherein feedback information from the detector 19 is compared with predetermined data about the machine component in the processor 19. Based on the comparison step, the computer system 13 signals the controller 114 to adjust the laser power of the laser source 112 so that only the surface contaminants 124 and the coatings 122 are ablated without causing any change in material properties of the base material 120 of machine component 118.

Figure 3:
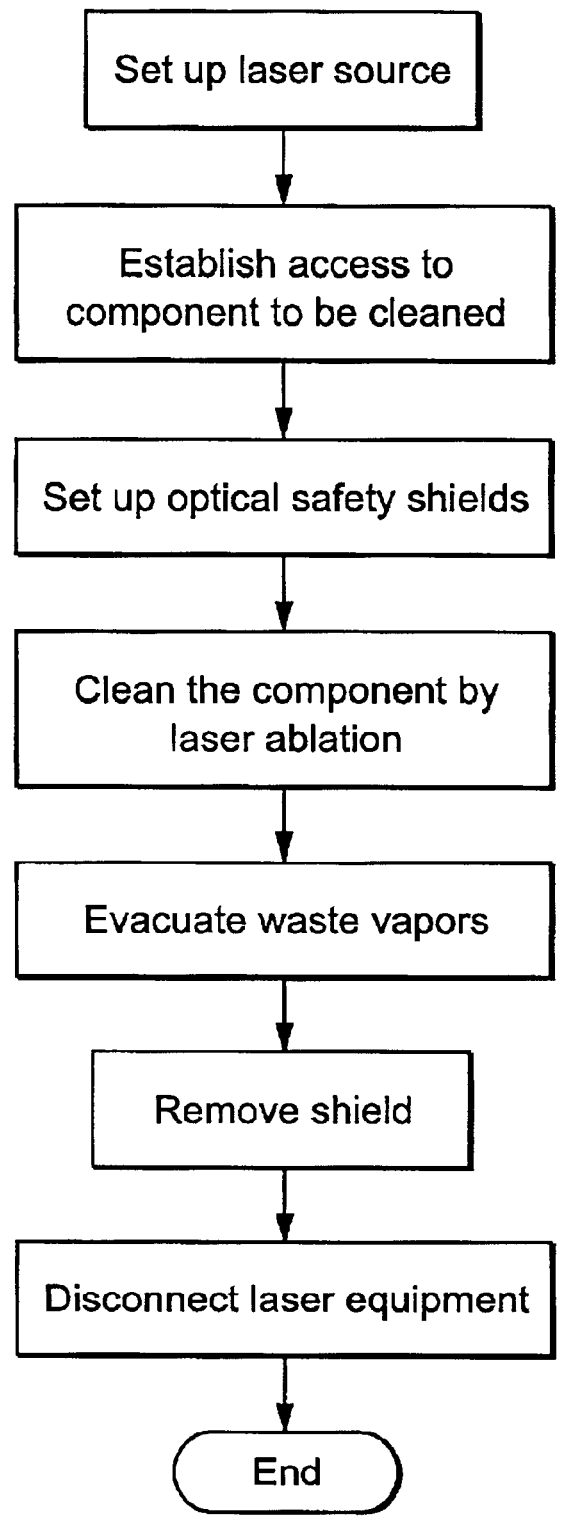
FIG. 3 illustrates a high level process flow chart for cleaning machine components using laser ablation method in accordance with an exemplary embodiment of the present invention.

In operation, as illustrated in FIG. 3, a laser beam from the laser source is directed at the surface of a machine component. The laser beam is preferably directed using a laser gun. In the first embodiment as in FIG. 1, the controller 14 is programmed with known laser power data to control the laser source to ablate and evaporate surface contaminants and surface coating(s) of component 18 without causing any changes in material properties of the base material. The surface material to be removed is heated so rapidly by the laser beam that the surface material is caused to vaporize. The laser ablation process preferably uses short laser pulses to cause very localized deposits of energy by exciting molecular bonds. The deposition of localized energy causes surface deposits to vaporize and explode, releasing the deposits from the surface to which they are attached. The vapors are then removed and filtered preferably by a vacuum collection system 26, 126.

Figure 4:
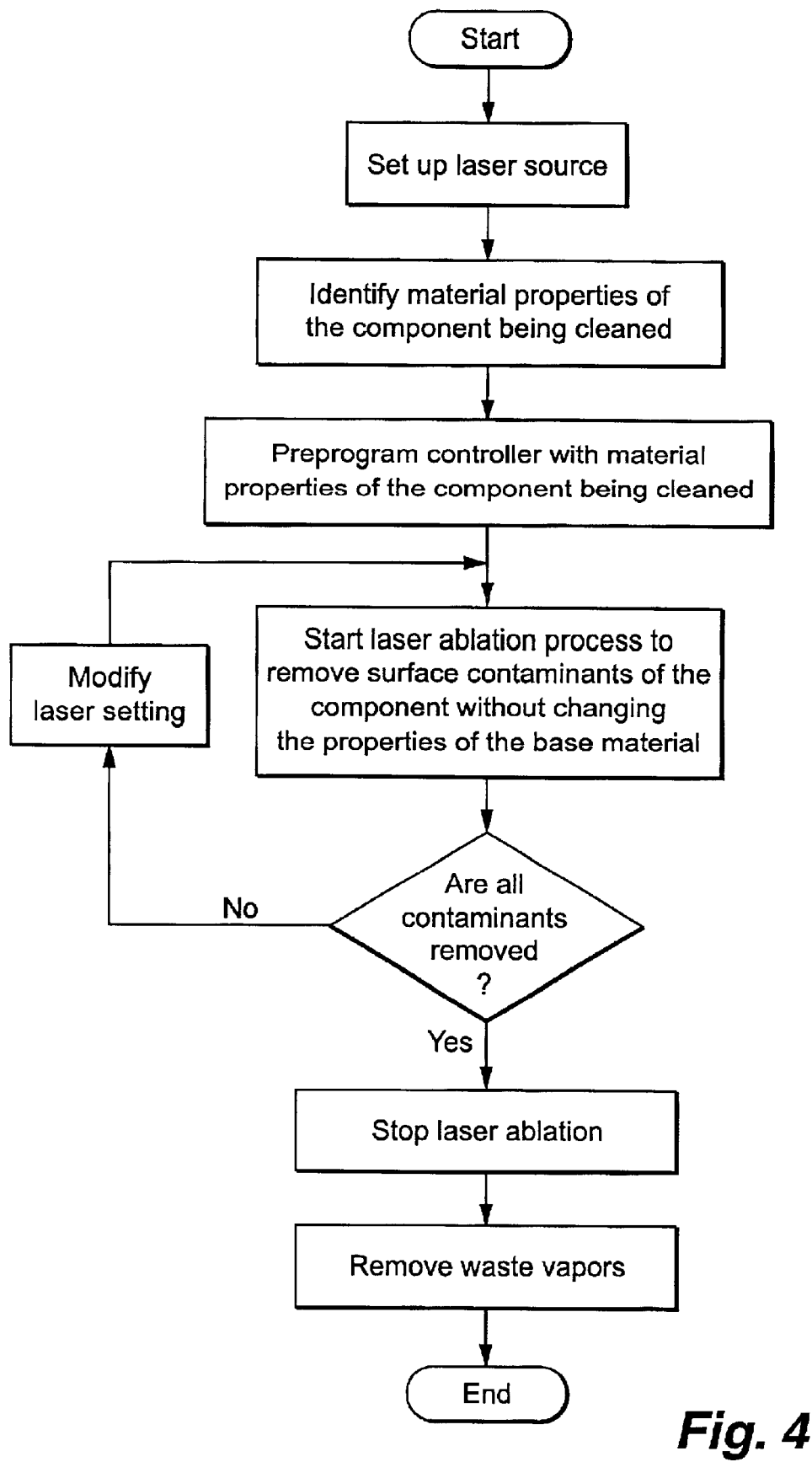
FIG. 4 is a detailed flow-chart illustrating the process steps involved when using the system shown in FIG. 1.

In another embodiment, as illustrated in FIG. 4, the controller is further coupled to a computer system, and a detector 19 is appropriately situated to continuously detect the degree of ablation of component 18. The detected information is fed back to the computer system where the detected information is compared with predetermined data related to the component. Based on the comparison step, the computer system issues signals to the controller for controlling the laser source such that only surface contaminants and surface coating(s) are ablated by the laser beam without causing any changes to the base material. The ablation process of the present invention significantly reduces waste products produced due to the vaporization of contaminants during removal.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of cleaning a machine component using a laser beam, the method comprising:
   programming a controller coupled to a laser source for controlling the laser source of the laser beam to perform laser ablation, wherein said controller accesses a database having laser power level data corresponding to various machines components;
   inputting to the controller information regarding the machine component to be cleaned;
   said controller automatically selecting a laser power level corresponding to the machine component by interrogating the database to determine a laser power level corresponding to the machine component, and
   directing the laser beam at the machine component surface for vaporizing surface contaminants and coatings deposited on said surface without changing base material properties of said machine component, wherein the laser beam is at the laser power level selected by the controller as corresponding to the machine component.

2. The method of claim 1, further comprising:
   coupling the controller to a computer system having a processor and said database;
   loading the database with the corresponding laser power level data, wherein said data indicates a laser power level for ablating surface contaminants or coatings from the surface and loading the database with machine component surface condition data;
   providing a detector to monitor the ablation of surface contaminants or coatings, and provide feedback data to the computer system;
   comparing the feedback data with the machine component surface condition data to determine progress of ablation; and
   controlling the laser source depending on the comparison step.

3. The method as in claim 1, further comprising: disposing of vapors generated during laser ablation.

4. A laser-based method for cleaning a machine component, the method comprising:
   programming a controller coupled to a laser source for controlling the laser source of the laser beam to perform laser ablation, wherein said controller accesses a database having data related to various machine components and corresponding laser power related data for ablating contaminants and coatings from the respective components;
   inputting to the controller information regarding the machine component to be cleaned;
   said controller automatically selecting a laser power level corresponding to the machine component by interrogating the database to identify the corresponding laser power data for the inputted machine component;
   controlling a laser source to apply a laser beam for performing laser ablation and operating at the laser power level selected by the controller;
   directing the laser beam towards a component surface for vaporizing surface contaminants or coatings deposited on the component surface without changing base material properties of the component;
   communicatively coupling a computer system having a processor and a database to the controller;
   monitoring ablation process of the component using a detector, the detector being disposed adjacent to the component;
   receiving feedback data from the detector at the computer system;
   comparing the feedback data with predetermined data in a comparator to determine progress of ablation; and
   controlling the laser source depending on the comparison step.

5. A method as in claim 1 further comprising:
   interrogating the database to obtain machine component data corresponding to the machine being cleaned;
   collecting vaporization data indicating surface conditions on the machine component surface being vaporized, and
   comparing the collected vaporization data with the machine component data to determine whether to cease vaporization of the surface by the laser beam.

6. A method as in claim 5 wherein the machine component data is at least one of data consisting of machine component material composition, thickness of a base material of said machine component, composition of a coating of the machine component, and thickness of the coating of the machine component.

7. A method as in claim 2 wherein the machine component surface condition data is at least one of data consisting of machine component material composition, thickness of a base material of said machine component, composition of a coating of the machine component, and thickness of the coating of the machine component.

* * * * *